United States Patent Office

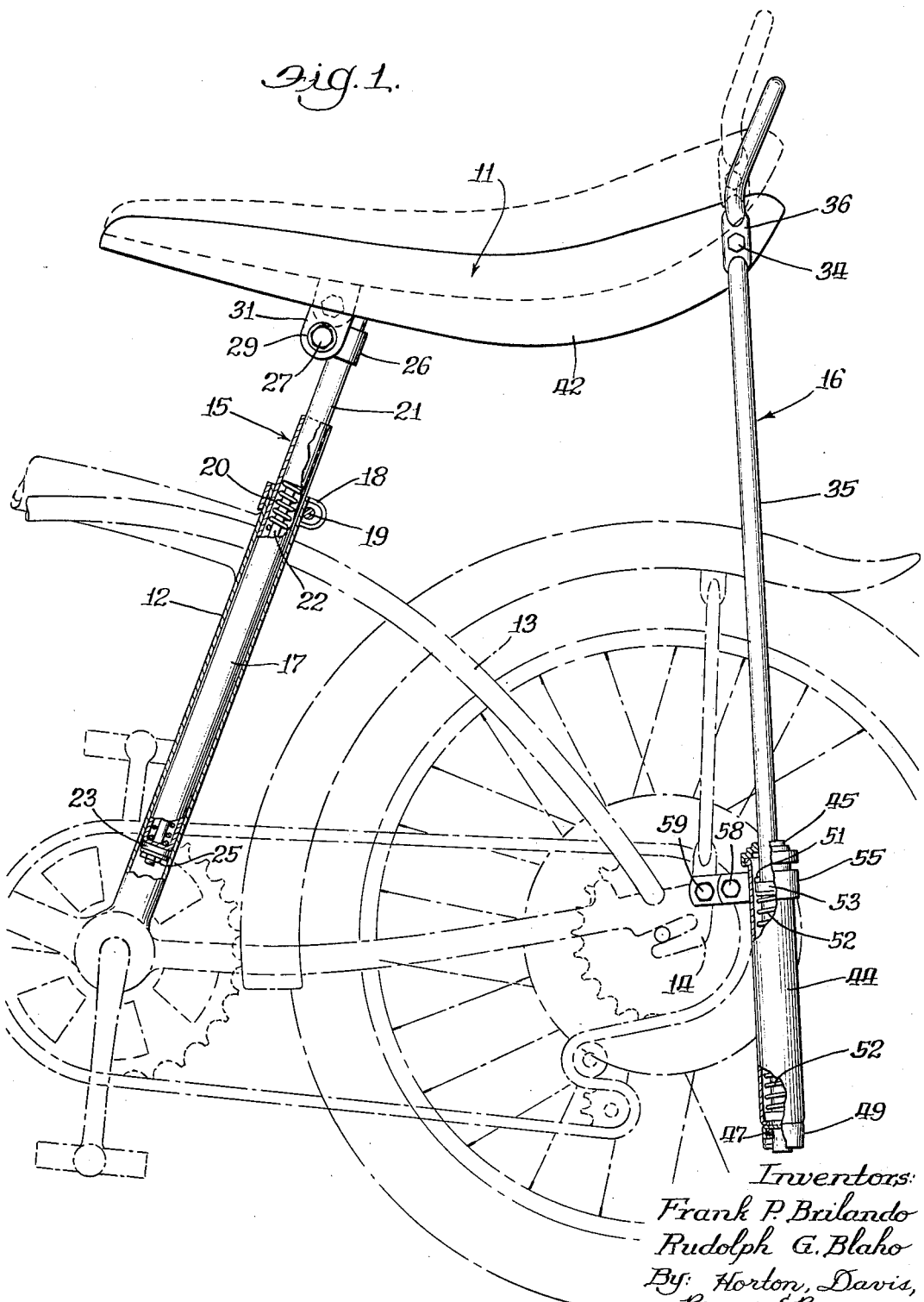

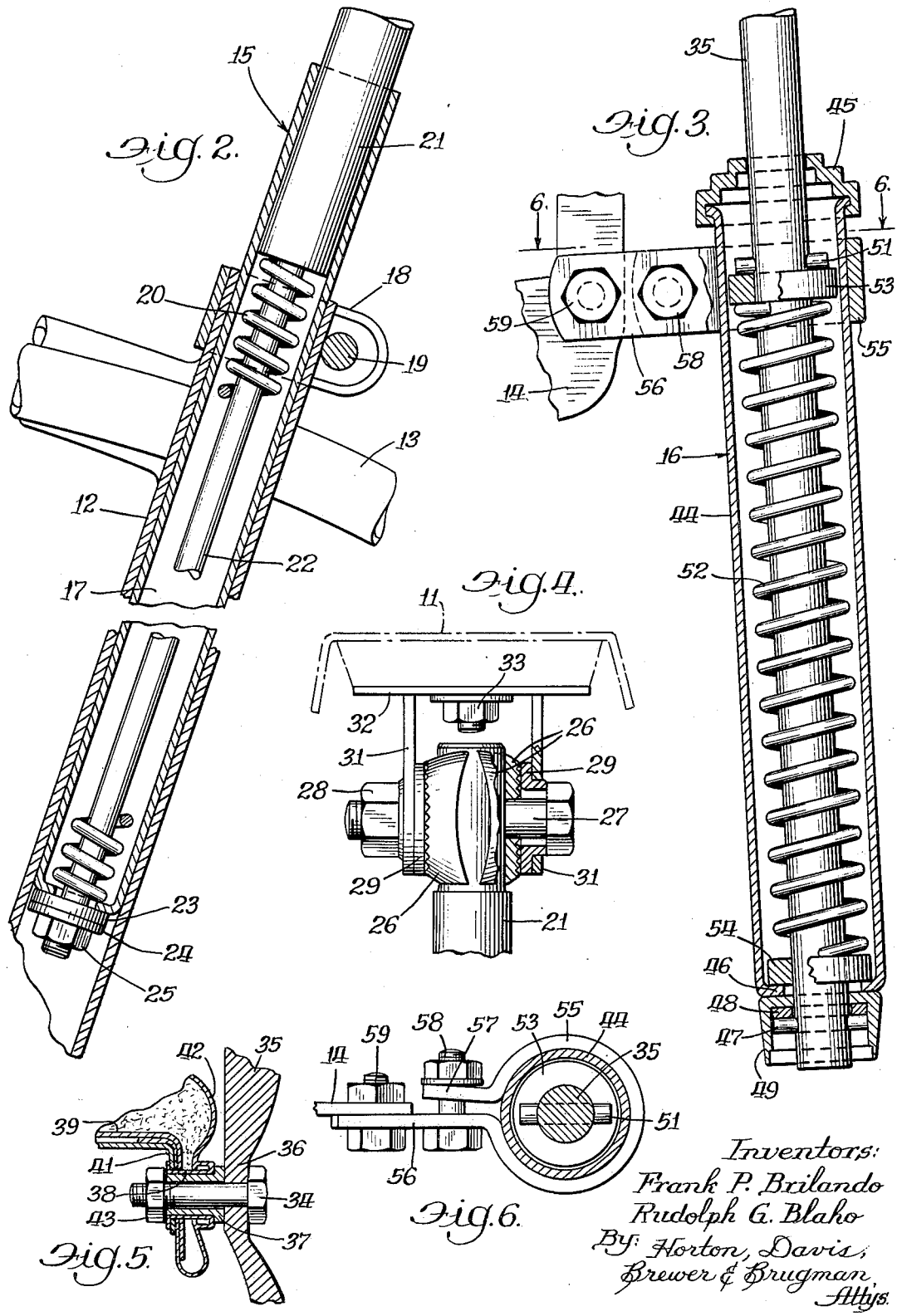

3,481,628
Patented Dec. 2, 1969

3,481,628
SPRING-LOADED BICYCLE SADDLE ASSEMBLY
Frank P. Brilando, Niles, and Rudolph G. Blaho, Franklin Park, Ill., assignors to Schwinn Bicycle Company, Chicago, Ill., a corporation of Illinois
Filed Jan. 10, 1968, Ser. No. 696,871
Int. Cl. B62k *19/00, 19/36*
U.S. Cl. 280—283                                6 Claims

ABSTRACT OF THE DISCLOSURE

Three point spring-loaded saddle suspension simply adjustable to mount elongated bicycle saddle at desired height and angular disposition of longitudinal center line thereof without affecting tension of springs, comprising seat post and tensioned spring assembly pivotally mounted at forward portion of saddle and vertically adjustably supported by bicycle frame, and rear strut and tensioned spring assembly pivotally secured to saddle and supported by frame at opposite sides thereof for independent vertical and pivoted adjustments.

BACKGROUND OF THE INVENTION

This invention relates to bicycle saddles and more particularly to the currently popular elongated saddles and the provision of spring-loaded suspension means therefor.

Compression spring shock absorber means interposed between a vertically adjustable saddle post and a saddle supported thereby have been employed, especially on motor cycles, such as that shown in U.S. Letters Patent No. 1,120,379. But that structure is not satisfactorily adaptable for use with elongated saddles, like that disclosed in co-pending application Ser. No. 539,779, filed Apr. 4, 1966 (now Patent No. 3,408,090). For example, there is only a single pivot between the saddle and its supporting means in the structure of Patent No. 1,120,379 to enable cushioning movements of the saddle during use. Likewise, the saddle supporting means of No. 2,167,912 is not susceptible of use with these elongated saddles as spring-loaded suspension means simply adjustable to effect the desired height and angular disposition of the saddle even though, in addition to providing for vertical adjustments of a spring-loaded saddle without varying or affecting the tensioning of the spring means, the structure of that patent also enables tilting or angular adjustments of the saddle to be made. The inapplicability of these prior structures to the present elongated saddles in large measure is due to the necessity of supporting the latter at points relatively widely separated from each other longitudinally of the cycle frame. And although Patent No. 2,467,676 discloses three point spring-loaded saddle suspension means, the structure of that patent requires a fourth pivotal connection between the latter and the cycle frame and, more importantly, there is no provision therein for any vertical or angular adjustments of the saddle relative to that frame.

SUMMARY OF THE INVENTION

This invention provides a three point spring-loaded suspension for elongated saddles for bicycles comprising a seat post and tensioned spring assembly pivotally secured to the forward portion of the saddle and vertically adjustably supported by the bicycle frame, and a rear strut and tensioned spring assembly pivotally secured to the rear portion of the saddle and supported by the frame at opposite sides thereof for independent vertical and pivotal adjustments, whereby simple adjustments readily may be effected to selectively vary the height and/or the longitudinally angular disposition of the saddle to suit the individual requirements of any rider, without affecting the tensioning of any of the springs of those assemblies.

DESCRIPTION OF THE PREFERRED EMBODIMENT

In the drawings:
FIGURE 1 is a side elevation of an elongated saddle and spring-loaded suspension for mounting the same on a bicycle, parts of the bicycle being shown in broken lines and different adjustable positions of the saddle being illustrated in full and dotted lines;
FIG. 2 is a detail vertical section taken longitudinally through the seat post and tensioned spring assembly;
FIG. 3 is a section similar to FIG. 2 through the lower end of one portion of the rear strut and tensioned spring assembly;
FIG. 4 is a detail front view, as seen from the left side of FIG. 1, of the attachment of the saddle to the seat post, with parts shown in vertical section;
FIG. 5 is a detail vertical section taken transversely through one of the pivotal connections between the saddle and the rear strut; and
FIG. 6 is a detail horizontal section taken substantially on the line 6—6 of FIG. 3.

Referring more particularly to the drawings, an embodiment of the invention comprising a spring-loaded suspension is illustrated for mounting an elongated saddle 11 on a bicycle having a frame which includes a seat mast 12, and a rear fork 13 with axle-supporting plate means 14 at each side of the lower end thereof. The spring-loaded saddle suspension comprises a seat post and tensioned spring assembly indicated generally by reference numeral 15, and a rear strut and tensioned spring assembly generally designated by reference numeral 16.

The seat post and tensioned spring assembly 15 includes a cylindrical housing 17 slidably disposed within the seat mast 12 and vertically adjustably secured in any desired position by means of a suitable clamp 18, which embraces the usual split upper end of the hollow mast 12, and bolt means 19 cooperating in well-known manner therewith. Slidably disposed within the upper portion of the housing 17 and protruding upwardly therefrom is a seat post 21 having an elongated guide rod or bolt 22 secured in any desired manner at its upper end thereto and extending downwardly through a suitable aperture in the end wall of the housing 17. Mounted on the lower end of the bolt 22 exteriorly of housing 17, as best seen in FIG. 2, are a suitable neoprene washer 23, metal washer 24 and lock nut 25. A coil spring 20 is mounted on the bolt 22 within the housing 17 and is tensioned or compressed to the desired tension between the lower end of the latter and the seat post 21 by the nut 25.

The upper end of the seat post 21 (FIGS. 1 and 4) is embraced by a split clamping bracket 26 having its spaced ends apertured to receive a transverse clamping bolt 27. Surrounding bolt 27 and interposed between the preferably serrated outer surfaces of the spaced ends of bracket 26 and the head of the bolt, and a nut 28 thereon, respectively, are flanged bushings 29 which are disposed as bearings in suitable apertures in depending arms 31 of a forward seat bracket 32 rigidly secured in any suitable manner, as by nut and bolt means 33, to a forward portion of the saddle 11. With this arrangement, the bracket 26 is clampingly secured to seat post 21 and the forward portion of saddle 11 is pivotally mounted thereon.

The rear end of saddle 11 is pivotally supported at each side by the rear strut and tensioned spring assembly 16 through the agency of bolts 34. This rear assembly 16 includes an inverted U-shaped strut 35 each leg of which preferably is flattened or cross-sectionally reduced laterally at 36 near its upper end and apertured to receive a bolt 34, as best seen in FIG. 5. Rotatably mounted on the inner portion of each bolt 34 is a flanged sleeve or bushing 37 which carries a grommet 38 extending therewith through a suitable aperture in a depending portion of a seat frame member 39. The grommets 38 cooperate with clips 41 to secure a flexible seat cover 42 to the frame member 39, and suitable fastening means, such as nuts 43, are mounted on the inner ends of the bolts 34 to complete the pivotal interconnection of the saddle 11 and rear strut 35.

Slidably mounted on each of the lower ends of the strut 35 (FIGS. 1 and 3) is a cylindrical spring housing 44, the upper end of which is provided with a suitable cap 45. The lower end of the associated strut 35 passes through a suitable aperture in a lower flange or end wall 46 of the housing 44 and is provided with a transversely extending pin 47 therebelow for retaining a metal washer 48 and a lower end cap 49 thereon. An upper pin 51 similar to the pin 47 is provided through the strut 35 below the upper cap 45, and a coil spring 52 is slidably mounted on the lower portion of each leg of the strut 35 within its associated housing 44 which is tensioned or compressed to the desired tension between an upper bushing 53 interposed between the pin 51 and the upper end of the spring and a lower bushing 54 disposed between the end wall 46 of housing 44 and the lower end of the spring. With this arrangement, each spring 52 supports a lower end of the inverted U-shaped strut 35 on the end wall 46 of the associated spring housing 44.

As best seen in FIGS. 3 and 6, adjustable means are provided for securing each spring housing 44 to one of the axle-supporting plate means 14 which comprises a clamping means 55 for engaging a selectable peripheral portion of the associated housing 44, having a long arm 56 and a short arm 57 and clamping bolt and nut means 58 for drawing said arms together to secure the clamping means 55 to its housing 44, and pivotally adjustable means for securing the clamping means 55 to the associated plate means 14 in the form of the outer forwardly extending portion of the long arm 56 and suitable clamping bolt and nut means 59.

From the above, it will be appreciated that the elongated saddle 11 has its forward portion pivotally supported by the bolt 27 on the upper end of the seat post 21 and is vertically adjustably supported by the frame of the bicycle by means of the seat mast 12 and clamping means 18, 19 engageable with the spring housing 17; that the rear portion of the saddle is pivotally mounted at two laterally disposed points at 34 by the inverted U-shaped strut 35 which is supported by the bicycle frame at opposite sides thereof for independent vertical and pivotal adjustments by means of the clamping means 58 and 59; and that any desired such vertical adjustments of the saddle may be accomplished without in any way affecting the tensioning of the supporting and cushioning springs 20 and 52. Also, the pivotal adjustments available at 59 independently of those obtainable vertically with the adjustable clamping means 58 assure proper angular disposition at all times of the spring housings 44 so as to avoid any binding between the latter and strut 35. By virtue of the said pivotal connections for the saddle 11, the longitudinally angular disposition of the saddle, as well as its height, may be selectively varied to suit the individual requirements of any rider. Such possible adjustments are illustrated in FIG. 1 wherein the saddle 11 is shown in full lines in one position and in broken lines in a vertically higher position, with the saddle also having a different longitudinally angular disposition in those two positions.

It is thought that the invention and many of the attendant advantages will be understood from the foregoing description, and it will be apparent that various changes may be made in the form, constructions, and arrangements of the parts, the form hereinbefore described being merely a preferred embodiment thereof.

We claim:

1. A spring-loaded suspension for an elongated saddle for a bicycle having a frame, comprising a seat post and tensioned spring assembly pivotally secured to the forward portion of the saddle and vertically adjustably supported by said frame, and a rear strut and tensioned spring assembly pivotally secured to a rear portion of said saddle and supported by said frame at opposite sides thereof for independent vertical and pivotal adjustments, whereby single adjustments may be effected to selectively vary the height and/or the longitudinally angular disposition of the saddle to suit individual rider requirements without affecting the tensioning of said springs.

2. A spring-loaded suspension according to claim 1, wherein each said assembly comprises a cylindrical housing enclosing the associated said spring.

3. In a spring-loaded suspension according to claim 2, individually adjustable means for clampingly securing each said housing to said frame.

4. A spring-loaded suspension according to claim 3, wherein said rear strut assembly comprises a said cylindrical housing at each side of said frame, and means for adjustably pivotally securing each said individually adjustable means to said frame.

5. A spring-loaded suspension according to claim 1, wherein said frame includes a rear fork and axle-supporting plate means at each side of the lower end thereof, and said rear strut assembly comprises an inverted U-shaped strut, a cylindrical housing slidable mounted on each of the lower ends of said strut, with a said spring interposed between each said housing and said strut, and adjustable means for securing each said housing to a said plate means.

6. A spring-loaded suspension according to claim 5, wherein each said adjustable means comprises clamping means for engaging a selectable peripheral portion of the associated said housing, and pivotally adjustable means for securing said clamping means to the associated said plate means.

References Cited

UNITED STATES PATENTS

| | | | |
|---|---|---|---|
| 651,277 | 1/1900 | Smith | 297—211 X |
| 1,717,056 | 6/1929 | Mesinger | 248—402 X |
| 2,080,658 | 5/1937 | Duffy | 297—211 |
| 2,167,912 | 8/1939 | Schwinn | 297—209 |
| 2,467,676 | 4/1949 | Labine | 297—211 |
| 3,258,290 | 6/1966 | Karbin | 297—195 |

KENNETH H. BETTS, Primary Examiner

U.S. Cl. X.R.

297—209